United States Patent
Fahrbach et al.

(10) Patent No.: US 7,541,830 B2
(45) Date of Patent: Jun. 2, 2009

(54) DEVICE FOR A LINE TERMINATION OF TWO-WIRE LINES

(75) Inventors: Wilhelm Fahrbach, Bietigheim (DE); Udo Weyhersmueller, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/981,299

(22) Filed: Oct. 30, 2007

(65) Prior Publication Data

US 2008/0136444 A1 Jun. 12, 2008

Related U.S. Application Data

(63) Continuation of application No. 10/538,526, filed as application No. PCT/DE03/04133 on Dec. 16, 2003.

(30) Foreign Application Priority Data

Dec. 30, 2002 (DE) ............................ 102 61 386

(51) Int. Cl.
*H03K 17/16* (2006.01)
*H03K 19/003* (2006.01)
*G11C 7/10* (2006.01)

(52) U.S. Cl. .................... 326/30; 365/189.05
(58) Field of Classification Search .................... 326/30
See application file for complete search history.

(56) References Cited

U.S. PATENT DOCUMENTS

| 5,761,244 | A | 6/1998 | Hedberg |
| 6,154,061 | A | 11/2000 | Boezen et al. |
| 6,324,044 | B1 * | 11/2001 | Teggatz et al. ............... 361/119 |
| 6,590,413 | B1 * | 7/2003 | Yang ............................. 326/30 |
| 6,700,823 | B1 * | 3/2004 | Rahman et al. ......... 365/189.05 |
| 6,815,980 | B2 | 11/2004 | Kerr |
| 6,836,144 | B1 | 12/2004 | Bui et al. |
| 6,853,213 | B2 | 2/2005 | Funabe |
| 6,888,369 | B1 | 5/2005 | Wang et al. |
| 6,922,073 | B2 | 7/2005 | Haaase et al. |
| 6,980,022 | B1 | 12/2005 | Shumarayev et al. |
| 7,038,485 | B2 * | 5/2006 | Nakashima et al. ............ 326/30 |
| 2003/0169068 | A1 * | 9/2003 | Fotouhi ........................ 326/30 |

FOREIGN PATENT DOCUMENTS

| DE | 195 25 350 | 1/1997 |
| EP | 1 211 849 | 6/1992 |
| EP | 0 693 730 | 1/1996 |
| WO | WO9515616 | 6/1995 |

* cited by examiner

*Primary Examiner*—Vibol Tan
*Assistant Examiner*—Dylan White
(74) *Attorney, Agent, or Firm*—Kenyon & Kenyon LLP

(57) ABSTRACT

A device for a line termination of two-wire lines having at least one first and second terminating resistant between the two wires is provided, the first and the second terminating resistors being connected in series, and at least one switching arrangement being provided between the two terminating resistors.

4 Claims, 1 Drawing Sheet

DEVICE FOR A LINE TERMINATION OF TWO-WIRE LINES

CROSS-REFERENCE TO RELATED APPLICATIONS

The present application is a continuation of U.S. patent application Ser. No. 10/538,526 filed on Dec. 12, 2005, which in turn was a national-phase application based on international application PCT/DE03/04133 filed on Dec. 16, 2003, and claimed priority to German Application DE 102 61 386.9 filed on Dec. 30, 2002.

FIELD OF THE INVENTION

The present invention relates to a device for a line termination of two-wire lines having a first and second terminating resistor between the two wires, the first and the second terminating resistor being connected in series.

BACKGROUND INFORMATION

A device for a line termination of two-wire lines is described in the German patent DE 195 25 350. It is described there that at least one first and one second terminating resistor are provided between the two wires of the two-wire line and that the two resistors be connected in series. Originating with the connecting line between the two resistors is a line that is connected to a fixed voltage potential, especially ground. Until now, the terminating resistor has always been permanently predefined, especially in a CAN bus system, i.e., either implemented or not implemented in the control unit. As a consequence, there is no flexibility in use.

Therefore, it is an object of the present invention to provide a device that allows greater flexibility when used in a line termination of two-wire lines.

SUMMARY

The present invention provides a device for a line termination of two-wire lines having at least one first and one second terminating resistor between the two wires, the first and the second terminating resistor being connected in series, and at least one switching arrangement being provided between the two terminating resistors.

This increases the flexibility during use since a rapid switch or rapid adaptation is possible in the application when using the terminating resistor configured in this manner.

In an advantageous manner, the device according to the present invention may be used in connection with a CAN bus system and assumes the receive and/or transmit function therein, so that the two-wire line is part of a CAN bus system, i.e., the lines CAN high and CAN low.

In addition, a switching logic is provided, which triggers the at least one switching means as a function of an input signal.

Furthermore, in an example embodiment, it is provided that this input signal is generated by an arithmetic function block, e.g., the microcontroller itself.

The use of a configurable terminating resistor, in particular a CAN terminating resistor, makes it possible to adapt the termination resistor to the individual application, either by controlling the switching logic via software (via digital output from μc) or via hardware, i.e., by way of a hardware bridge in the cable harness plug. This minimizes the multitude of control units, especially on the side of the customer and supplier, for instance to a single control unit for stand-alone, master and slave, for example, instead of one for each application. The result is reduced expenditure for logistics and stock-keeping and, in particular, also lower costs for customers and suppliers.

In an advantageous manner, a balancing member is connected between the terminating resistors, which, in an example embodiment, is able to be connected thereto by one switching means for each terminating resistor.

In this way, a control unit, e.g., for the control of operating sequences in a vehicle, is able to be adapted to various applications by software configuration, in particular.

DETAILED DESCRIPTION

Figure 1:
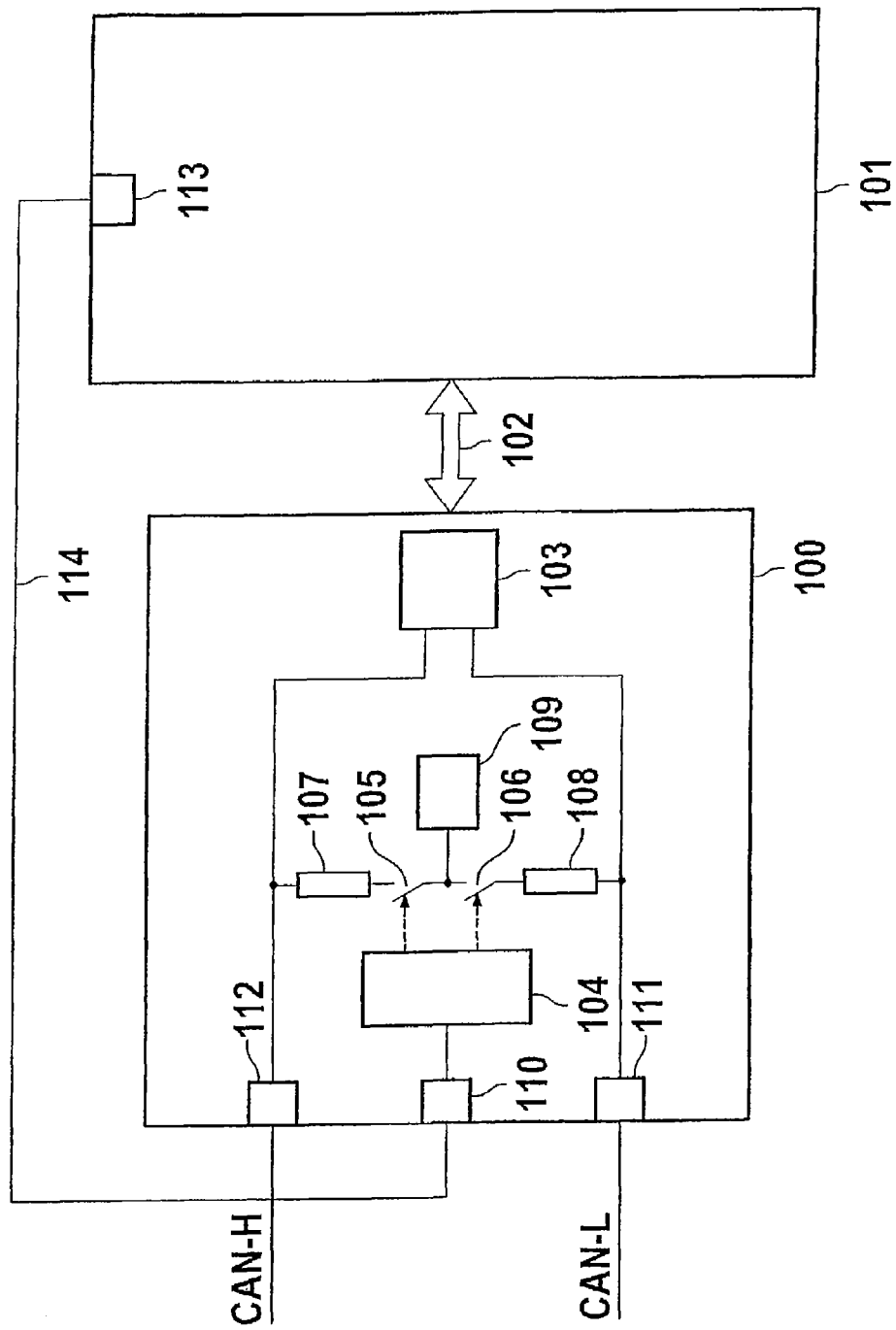
FIG. 1 shows a block diagram of a device according to the present invention.

The single FIGURE—FIG. 1—shows a CAN high and a CAN low line, CAN-H and CAN-L, respectively, which are connected to a component 100 via coupling elements 111 and 112, respectively, which component 100 functions as a CAN transceiver, that is, component 100 assumes the receive and/or transmit functionality, i.e., the transceiver function of a CAN component in this respect. The CAN-High and CAN-Low lines are guided to a driver module, in particular a CAN driver module 103. Furthermore, two terminating resistors 107 and 108 are shown, which are connected in series and, with the aid of switching means 105 and 106, are able to be connected to one another and also to a balancing unit, i.e., a balancing element 109. Switching means 105 and 106 are addressed by a control logic 104, which action is symbolically denoted by the dashed arrows. The control logic 104 itself receives an input signal via line 114 and an additional coupling element 110, for instance from an output 113 of the arithmetic function block or microcontroller 101. Furthermore, the microcontroller 101 is connected to the driver module 103 for the communication via a communication connection 102 in a unidirectional and/or bidirectional manner.

On the basis of the input signal at control logic 104, it is possible to select whether the terminating resistor is active or separated from the bus. On the one hand, the input signal may be generated or picked off digitally, i.e., via microcontroller output 113, or via a bridge in the cable-harness plug. The separation from the bus may be realized by two electrical switches, i.e., switching means 105 and 106. This allows the configuration of the terminating resistor to be modified at any time via the microcontroller output; in the case of a bridge in the cable-harness plug, this is possible only after its reconfiguration.

Due to the installation of the configurable CAN terminating resistor, the terminating resistor is able to be adapted to the particular application either by software-based or hardware-based triggering of the switching logic. In a software-based adaptation, the digital output of microcontroller 101 will be used for this purpose. In a hardware-based adaptation, this is implemented by a bridge in the cable-harness tree. In the case of control units for the control of operating sequences, e.g., in a motor vehicle, this minimizes the multitude of control devices for customers and suppliers. An adaptation of the CAN terminating resistor of the control unit to various applications may therefore be implemented solely by modifying the software configuration, so that a simple and flexible possibility for a rapid application adaptation is provided.

What is claims is:

1. A device for providing a line termination of a two-wire line, wherein the two-wire line is a part of a CAN bus system, comprising:

a first terminating resistor and a second terminating resistor provided between the two wires of the two-wire line, wherein the first and the second terminating resistors are connected in series;

at least one switching arrangement provided between the first and second terminating resistors, wherein the at least one switching arrangement is configured to separate the first and second terminating resistors from the two-wire line, and wherein the device assumes at least one of a receive function and a transmit function in the CAN bus system;

a control logic configured to control the at least one switching arrangement based on a control signal from a microcontroller sent over a first communication channel; and a driver module configured to provide at least one of a unidirectional and bidirectional communication with the microcontroller over a second communication channel.

2. The device as recited in claim 1, wherein the at least one switching arrangement comprises a first switching arrangement to selectively separate the first terminating resistor from the two-wire line and a second switching arrangement to selectively separate the second terminating resistor from the two-wire line.

3. The device as recited in claim 1, further comprising:

a balancing element connected between the first and second terminating resistors.

4. The device as recited in claim 3, wherein each of the first and second terminating resistors is configured to be selectively connected to the balancing element by the at least one switching arrangement.

* * * * *